Aug. 23, 1927.
W. B. CHURCHER
1,639,882
ELECTRICAL SYSTEM
Filed Aug. 20, 1925
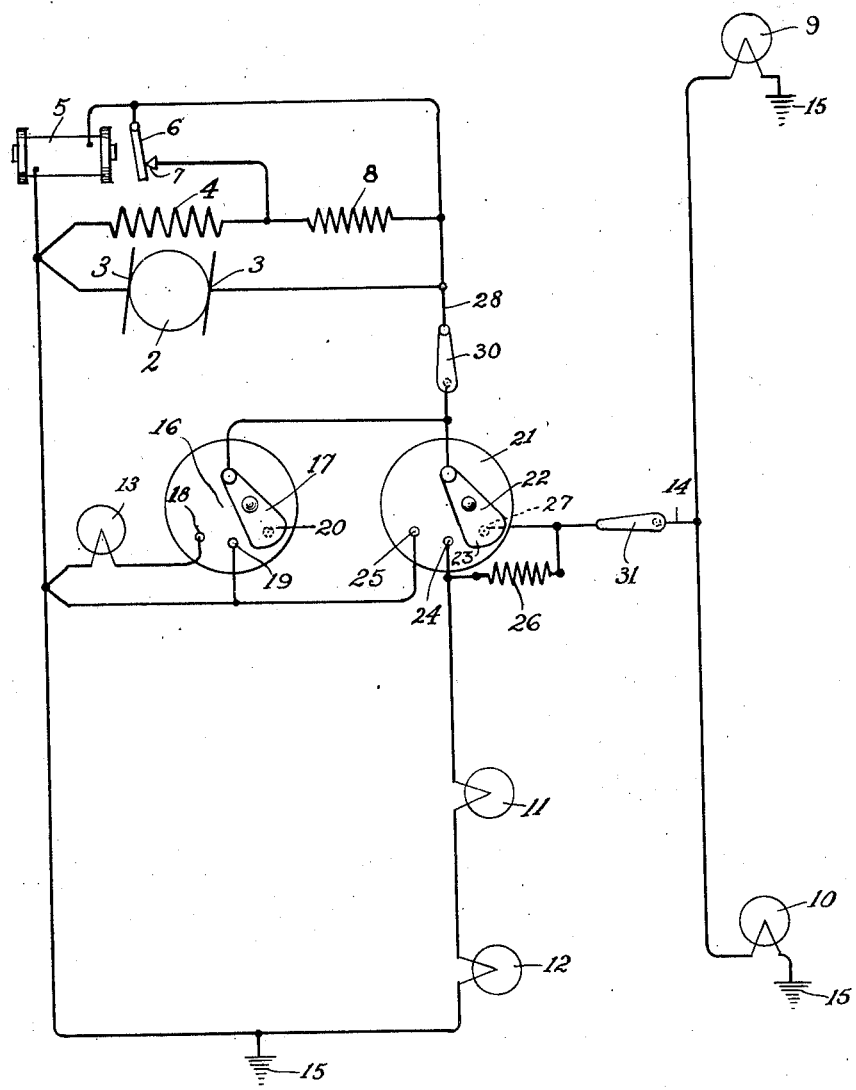
INVENTOR
William B. Churcher
BY Richey Slough & Watts,
His ATTORNEYS.

Patented Aug. 23, 1927.

1,639,882

UNITED STATES PATENT OFFICE.

WILLIAM B. CHURCHER, OF CLEVELAND HEIGHTS, OHIO, ASSIGNOR TO THE WHITE MOTOR COMPANY, OF CLEVELAND, OHIO, A CORPORATION OF OHIO.

ELECTRICAL SYSTEM.

Application filed August 20, 1925. Serial No. 51,283.

My invention relates to electrical systems and relates particularly to electrical systems, employing an electrical generator of the shunt field type, for the purpose of supplying electrical current to one or more electro-responsive devices, such as electrical lamps or the like.

An object of my invention is to accomplish in a system, comprising a shunt wound electrical generator and one or more current consuming devices such as electrical lamps adapted to be operated by current from the generator, the substantial discontinuance of the generation of electrical current without causing an impulse of relatively high voltage current to pass through one or more of the lamps thereby burning out the lamp or decreasing its effectual life.

Another object of my invention is to accomplish in a system of the above type, the disconnection of one or more of the electro-responsive devices from the energizing circuit comprising the generator, without causing an injurious momentary flow of current through other of the electro-responsive devices which are desired to be continued in the electrical circuit of the generator.

Another object of my invention is to accomplish in an electrical system comprising a shunt wound electrical generator and a plurality of electro-responsive devices such as lamps, the switching on and off of the lamps in an efficient manner and without injury to the lamps, or the generator.

Another object of my invention is to accomplish in a system of the above type comprising a voltage regulator, the disabling of the generator to effect discontinuance of electrical current flow to the load from the generator and at the same time to disable the voltage regulator.

Another object of my invention is to accomplish in an electrical lighting system comprising a shunt wound generator and a voltage regulator of the vibrating type, switching to entirely remove the load from the generator at the same time to disable the voltage regulator so that it will discontinue vibrating.

Other objects of my invention is to accomplish in an electrical lighting system comprising a shunt wound generator and a voltage regulator of the vibrating type, switching to entirely remove the load from the generator at the same time to disable the voltage regulator so that it will discontinue vibrating.

Other objects of my invention and the invention itself will be apparent from the following description of an embodiment of my invention and in which description reference will be had to the accompanying drawing forming a part of this specification.

In the drawing the single figure shows an electrical system diagrammatically illustrating an embodiment of my invention.

Referring to the drawing, at 2 I show a rotatable armature of an electrical generator, electrical contact with which is had by means of brushes 3 and which generator comprises an energizing field winding 4, connected in shunt of the armature 2. A relay winding 5 is also connected in shunt across the armature 2 at the brushes. The relay winding 5 is provided for the purpose of energizing the regulator relay having an armature 6 and a pair of contacts 7, the contacts 7 being in multiple with a resistance 8 serially connected with the field winding 4 across the brushes 3 of the generator. So far as described, the generator and other associated parts are as commonly provided for the purpose of supplying current for the purpose of lighting lamps, for such a purpose as illuminating an automotive truck or other automative vehicle upon which the generator may be installed.

The generator having the armature 2 may be of any of the usual types and may have a low speed characteristic involving a high armature reaction. Such a generator, for instance, as will be capable of supplying current for illuminating purposes at seven volts when its armature tube is rotated at a speed of,—say, 400 revolutions per minute, may be used.

In the embodiment of my invention illustrated I have shown a lamp load for the generator comprising motor vehicle headlights illustrated at 9 and 10, a rear tail lamp 11, a dashlamp 12 and a spotlight 13. The headlights and spotlights will be of relatively high current consuming capacity, being preferably of a high candle power such as 21 candle power each, whereas the rear tail and dash lamps shown at 11 and 12, will be only,—say, 2 candle power each. Preferably, as shown, these 2 candle power lamps are serially connected and each of a voltage rating one-half of that of the voltage rating of the headlights and tail lamps. For instance, the headlights and tail lamps may be rated at 6 to 8 volts whereas the serially connected lamps, 11 and 12, would in such case be rated, preferably, at from 3 to 4 volts each. The headlights are multiply connected across the circuit conductor 14 and ground 15 and which ground may be a return conductor to the generator and connected to the generator armature brush 3, or it may comprise in part the metallic frame of the motor vehicle. I show, at 16, an electrical switch comprising a blade 17 and stationary contacts 18 and 19. The spacing of the contacts 18 and 19 and the width of the contact end 20 of the blade are such that the said contact end is sufficiently wide that it may span the contacts 18 and 19, that is, it will overlap and make contact with both of the said contacts at the same time when placed in a position between the contacts. This arrangement insures, for a purpose later to be related, that when moving the blade 17 from a position wherein it makes contact with the contact 18 to a position wherein such contact is broken and contact had with the contact point 19, that contact will be had with the contact point 19 before contact with 18 is broken; that is, the switch will be of what is known as the "make-before-break" type.

Similarly, a switch 21, is provided having a switch blade 22 whose contact end 23 is of sufficient width relative to the spacing of the contacts 24 and 25, that prior to leaving the contact 24, contact will be had by the blade contact end with the contact 25.

A resistance coil 26 is connected between the contact points 27 and 24 of the switch 21 and with the switch blade 22 making contact with contact 24, will be serially included in the energizing circuit of the multipled headlights 9 and 10.

The head lamps 9 and 10 are adapted to be illuminated whenever the generator is operated at a sufficient speed, and the switch blade 22 is making contact with the contact point 27 of the switch, whereby full current from the generator will be directed through the headlights to light them to full brilliancy. They will be lighted less brilliantly if the blade 22 is moved to make contact with the contact point 24, since, in such case, current from the generator will proceed over circuit conductor 28 through the switch blade 22 and contact 24, through resistance coil 26 before passing through the multiply connected lamps 9 and 10. At the same time, the headlights are lighted, the rear tail lamps 11 and the serially connected dash-lamp 12 will also be lighted, in the first case through the resistance coil 26, and in the latter case above mentioned, directly through switch blade 22 and contact point 24. The above lighting of lamps 9 to 12 inclusive will only occur, however if the switch blade 17 of the switch 16 is in some other position than that wherein contact is had with the switch contact point 19. In the latter case the generator will be short circuited, and the lamps 9 to 12 inclusive shunted, and little or no current generated and no current will pass from the generator through the lamps.

At any time, whenever switch blades 17 or 22 make connection to ground by contacting with switch points 19 or 25, respectively, the generator will be short circuited and will generate little or no current.

The short circuiting of a shunt wound generator, such as that employed in the system described herein, will always short circuit the shunt field coil 4 so that no energizing current can pass through such field coil to energize the field of the generator. If the generator field is not energized the rotation of the armature 2 will not accomplish the cutting of lines of force which otherwise would be set up by the energized field, but which, in the present case would not be set up.

At 5 I show the energizing winding of the voltage regulator which is also multiply connected across the generator brushes 3 and which will also be short circuited whenever the switch blades 17 or 22 make contact with the switch points 19 or 25, respectively, to short circuit the generator. In all prior systems, so far as I am aware, it has been customary to open the circuit leading from the generator to the load in order to discontinue supplying current to the load, this being done, commonly, by opening the circuit of the circuit conductor 28 as at 30. In such systems the voltage regulator will continue to function and will vibrate its armature at a very rapid rate causing undue wear at its contacts 7.

In the system of my invention herein illustrated whenever the switch contacts mentioned are closed, the winding 5 of the voltage regulator magnet is also short circuited preventing current from passing through the same. At the same time the generator field 4 being shunted, the generator will not generate any considerable amount of current, generating only perhaps a very small amount of current due to residual magnetism contained in the iron cores of the magnets. The generation of this small amount of current is negligible in its effects on the system herein described.

In the systems of the prior art mentioned wherein the circuit of the load is broken, the disconnection of a part of the load such as disconnecting the headlights 9 and 10 by opening a switch which might be placed in the circuit of the circuit conductor 14 as indicated at a point therein 31 causes the generator to pass a momentary current of unduly high voltage through a minor portion of the load still remaining connected to the generator. This action is what is commonly called an inductive discharge or inductive "kick" due to the self-inductance of the generator.

I accomplish the desirable result of preventing any such inductive discharge from passing through any part of the load remaining connected to the generator after the disconnection of another part of the load, by arranging the switch contacts and providing a switch blade to cooperate therewith in the case of both the switches 16 and 21 whereby whenever the circuit of a part of the load is opened that prior to the opening of such circuit, the movable switch blade will make contact with a grounded contact of the switch and short circuit the generator. Thus, assuming that the switch blade 17 were making contact with the point 18 of the switch 16, and the switch blade 22 were making contact with the point 24 of the switch 21, and it is desired to eliminate the spotlight from the circuit to extinguish it, then the movement of the blade 17 toward the position illustrated wherein it does not make contact with any switch point is attended, first, by its making contact with the grounded contact 19 to short circuit the generator and its load, just prior to its reaching open circuit position. Thus no inductive discharge through the headlights 9 and 10 can occur since at the moment of breaking of the contact point 18 in the circuit of the spotlight, the generator and the said headlights will be short-circuited through contact point 19. Upon the switch blade 17 leaving the point 19 for its open circuit position, the generator will be re-energized and will come up to normal voltage, but without even momentarily producing a current of excessive voltage. If, for any reason, it is desired to discontinue the energization of the lamps 9 to 12 inclusive, this can be done in like manner by moving the switch blade 22 from its "bright" position in contact with the switch point 27 of switch 21 or from its "dim" position in contact with switch point 24 thereof to the grounded switch point 25 with which it will make contact just prior to the time it leaves contact with the switch point 24.

Since it is unlikely that it will be desired to operate the spotlight 13 exclusively, in the embodiment of my invention illustrated, I have shown no "open circuit" position for the switch 21 as illustrated for the switch 16 though, of course, one could be provided. With no lights lighted, the switch 21 will have its blade 22 take the short circuiting position and in this position the generator will be short circuited and will produce no considerable current.

The system of my invention is applicable to many different uses, but in the embodiment illustrated I have shown it as applied to the electrical system of a motor vehicle employing no storage battery in the lighting circuit. With such motor vehicles as trucks and the like, it is highly desirable to eliminate the necessity for a storage battery since the up-keep of a storage battery in such a vehicle is very costly and the servicing of such a storage battery is difficult. Moreover, the investment required will be unduly large since the percentage of the time lighting current is required, is but a small part of the total travelling time. When in use, the trucks are usually in motion and their engines are operating, so that "parking" lighting service is not generally required, and small kerosene lamps or the like, are commonly used at such rare times when the truck is at a standstill for a considerable period of time.

Having thus described my invention in a specific embodiment, I am aware that numerous and extensive departures may be made from the embodiment herein illustrated and described, but without departing from the spirit of my invention.

I claim:—

1. In an electrical system comprising a shunt wound generator, a load therefor, a switch having a set of "make-before-break" contacts having the "make" contacts thereof connected directly across the generator output terminals, and the "break" contacts in the circuit of said generator and load.

2. In an electrical system, a shunt wound generator, a load therefor, a switch, and means associated with said switch adapted in a continuous movement to successively shortcircuit the generator, open the load circuit and remove the shortcircuit from the generator.

3. In an electrical system, a shunt wound generator, a load therefor divided into a plurality of parts, a first part thereof comprising an electrical lamp filament, a switch for controlling the circuit of a second part of said load, and means associated with said switch adapted in a continuous movement to successively shortcircuit the generator, open the load circuit and remove the shortcircuit from the generator.

4. In an electrical system, a shunt wound generator, a load therefor, a voltage regulator energized from the generator and adapted to be de-energized when the generator is shortcircuited, and means associated with said switch adapted in a continuous movement to successively shortcircuit the generator, open the load circuit and remove the shortcircuit from the generator.

5. In an electrical system, a shunt wound generator, a load therefor divided into a plurality of parts, a first part thereof comprising an electrical lamp filament, a switch for controlling the circuit of a second part of said load, a voltage regulator energized from the generator and adapted to be deenergized when the generator is short-circuited, and means associated with said switch adapted in a continuous movement to successively shortcircuit the generator, open the load circuit and remove the shortcircuit from the generator.

In testimony whereof I hereunto affix my signature this 18th day of August, 1925.

WILLIAM B. CHURCHER.